Figure 1:
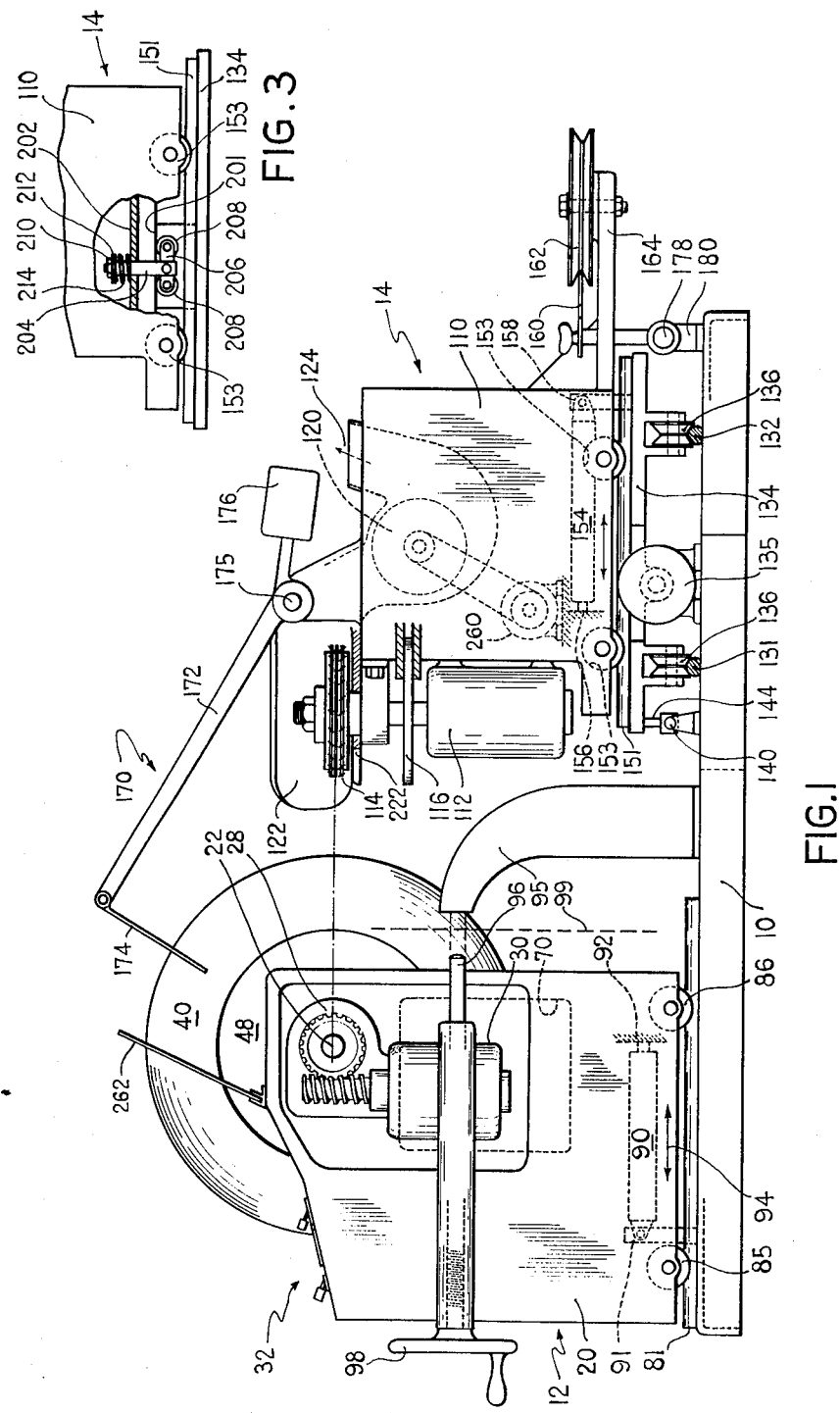

United States Patent [19]

Pelletier

[11] 3,910,337
[45] Oct. 7, 1975

[54] TIRE BUFFING APPARATUS AND METHOD
[75] Inventor: Guy Pelletier, Melbourne, Canada
[73] Assignee: Bombardier Limited, Valcourt, Canada
[22] Filed: Apr. 10, 1974
[21] Appl. No.: 459,645

[52] U.S. Cl. .......... 157/13; 51/DIG. 33; 144/288 A
[51] Int. Cl.² ........................................ B29H 21/08
[58] Field of Search ....... 157/13; 144/288 A; 51/51, 51/106 R

[56] References Cited
UNITED STATES PATENTS

| | | | |
|---|---|---|---|
| 2,786,526 | 3/1957 | Tobey | 157/13 |
| 2,888,065 | 5/1959 | Neilsen | 157/13 |
| 2,941,584 | 6/1960 | Glynn | 157/13 |
| 2,945,534 | 7/1960 | Hawkinson | 157/13 |
| 3,080,899 | 3/1963 | Robertson | 157/13 |
| 3,080,899 | 3/1963 | Robertson | 157/13 |
| 3,117,618 | 1/1964 | Olsen | 157/13 |
| 3,162,233 | 12/1964 | Stull | 157/13 |
| 3,195,179 | 7/1965 | Laube | 157/13 |
| 3,409,066 | 11/1968 | Antraigue | 157/13 |
| 3,528,476 | 9/1970 | Hawkinson, Jr. | 157/13 |
| 3,595,295 | 7/1971 | Curry | 157/13 |
| 3,646,984 | 3/1972 | Morgan et al. | 157/13 |
| 3,674,067 | 7/1972 | Cooper | 157/13 |
| 3,675,706 | 7/1972 | Cahill | 157/13 |

*Primary Examiner*—Al Lawrence Smith
*Assistant Examiner*—Harold P. Smith, Jr.
*Attorney, Agent, or Firm*—Larson, Taylor and Hinds

[57] ABSTRACT

Method and apparatus for buffing tires of varying diameters and width with maximum accuracy and in less time than is normally possible. The tire mounting structure is mounted on longitudinally extending rails and the buffing assembly travels on transverse rails at a constant speed that can be varied by the operator, and the contour is determined by a template which causes longitudinal control of the buffing assembly on an auxiliary carriage. A centering device enables accurate lateral adjustment of the template on the base without trial and error, and a split chuck facilitates mounting and inflation of the tire on the machine. A particular arrangement of rollers and rails ensures smooth carrier movements in a horizontal plane. An improved buffed surface finish is obtained by means of a last buffer pass with the tire rotating in the opposite direction.

11 Claims, 3 Drawing Figures

TIRE BUFFING APPARATUS AND METHOD

This invention relates to a method and apparatus for buffing tires in preparation for retreading by any known retreading processes, and in particular to a buffing apparatus that can be used for performing accurate buffing operations on any types of tires including radial tires having steel cords.

During the past decade, the field of tire retreading has evolved considerably starting from the basic hot-cure retreading processes wherein a layer of uncured rubber is vulcanized in place on the tire in a heating mold. The so-called cold-cure process which is still relatively new in the field has produced some remarquable results to the extent that a cold-cure retreading job which is accurately executed on a worn out tire whose structure is in good condition should permit mileage which is comparable to the mileage obtained with the tire when new. In effect, therefore, the total mileage which can be put on a particular tire is easily doubled.

It is generally agreed that such good wear characteristics are not normally obtainable by means of the hot-cure retreading process but at the same time it is generally recognized that the cold-cure retreading method requires particular care in the buffing operation and perhaps even more so than in the case of hot-cure retreading. As a matter of fact, considerable hesitation to adopting presently available retreading techniques results from the fear that the quality of the retreaded tire, assuming that the structure of the tire had not been damaged prior to retreading, is too heavily dependent upon the skill of the operator who performs the buffing operations.

Thus an object of this invention is to provide an automatic tire buffing apparatus giving reproducible results within satisfactorily close tolerances without undue reliance upon the skill of the operator.

Another object of this invention is to provide such a buffing apparatus which is adapted to receive tires of varying widths and diameters over wider ranges than is normally possible with conventional buffers.

It is also an object of this invention to provide an improved surface texture on the buffed area of a tire, to cut down the number of operations which the operator is required to carry out when buffing tires of different nominal sizes and also to provide a buffing apparatus which is of relatively simple construction and yet which can achieve perfectly controlled tire profiles in less time than is ordinarily feasible with ordinary buffers. A further object is to provide a buffer which is safe to operate and which can be used for buffing tires that use steel cords.

One embodiment of the invention therefore provides an apparatus for buffing tires which comprises a buffing assembly and a tire mounting assembly each of which is supported on horizontally disposed rectilinear rails such as to permit longitudinal displacement of the tire mounting assembly for adjustment of the depth of the cut while the buffing assembly is transversely displaceable in a reciprocatory motion. An auxiliary carriage onto which the buffing assembly is mounted is free to move longitudinally in a direction parallel to the direction of displacement of the tire mounting assembly and a template which is fixed relative to the buffing assembly and to the auxiliary carriage controls the longitudinal positioning of the buffing assembly throughout the transverse motions of the buffing assembly. The template thereby controls the profile of the buffed tire hence a different template is required for each different tire width.

The tire mounting assembly and the buffing assembly are supported onto their respective rails by means of self-aligning rollers, and an inverted track system prevents derailing or lifting of the assemblies and ensures smooth displacements of each assembly in a horizontal plane.

A tire tread center finder is provided which accurately determines the position of the tire in relation to the buffing apparatus and an indication is provided which enables the operator to readily adjust the position of the template without trial and error.

This invention further provides a method of buffing a tire to be retreaded which comprises rotating the tire in one sense throughout the entire buffing operation and while maintaining the same setting of the buffing apparatus making one last buffer pass while the tire rotates in opposite sense.

A split chuck construction is also provided which simplifies mounting and inflation of a tire to be retreaded, which construction is relatively simple.

Figure 2:
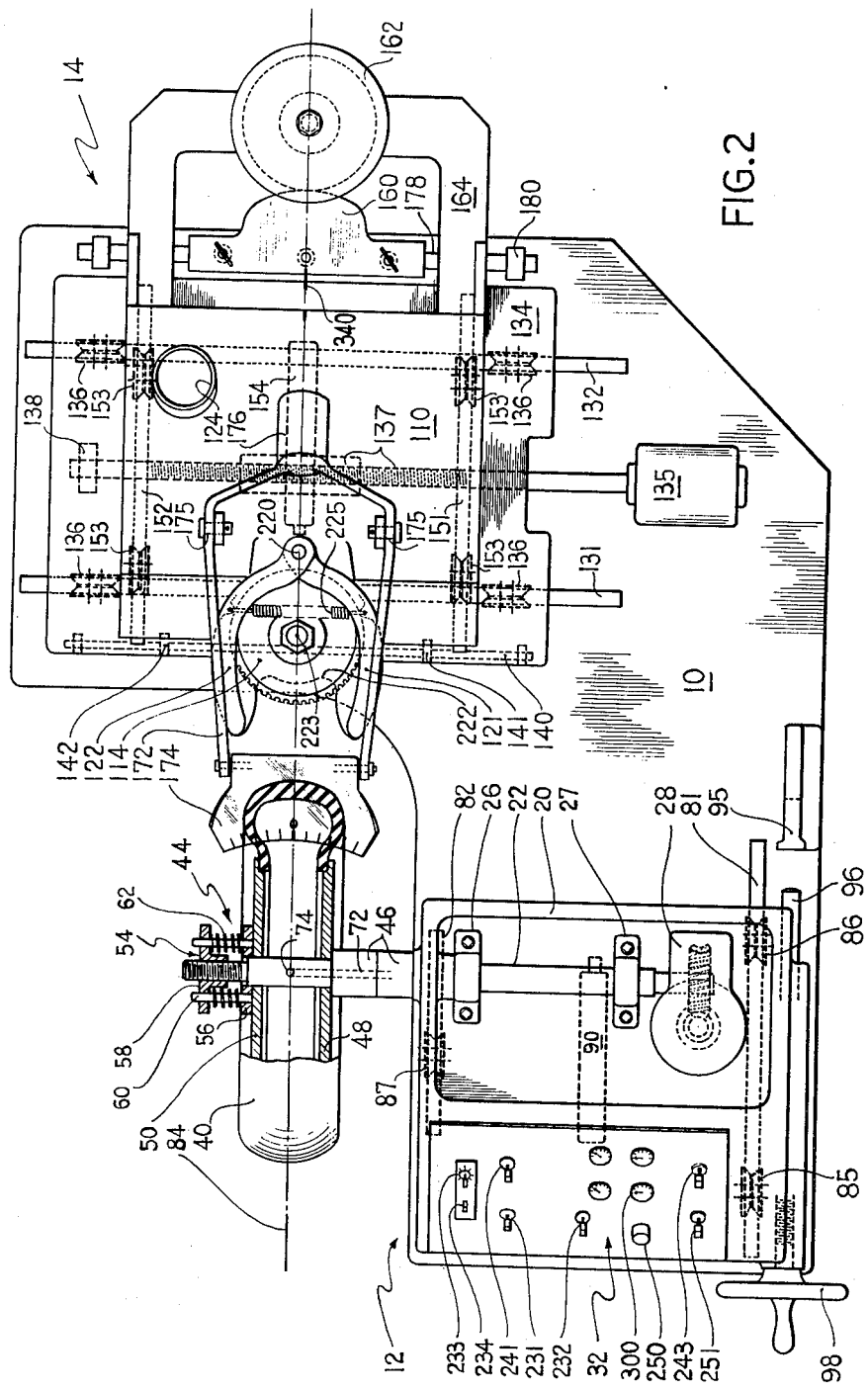

Other features of this invention including a particular set of controls, and a special dust collector will become apparent from the following description of an embodiment of this invention given in connection with the accompanying drawings wherein:

FIG. 1 is a side elevation view of a buffing apparatus in accordance with this invention, FIG. 2 is a top view of the buffing apparatus illustrated in FIG. 1, FIG. 3 is an illustration of a main track and roller assembly showing an inverted track with spring loaded rollers.

Referring now to FIGS. 1 and 2, a buffing apparatus is shown which combines a base 10, a tire mounting assembly 12, a buffing assembly 14 and support means for mounting these assemblies on base 10.

Tire mounting assembly 12 comprises a housing 20, a rotatable tire supporting shaft 22, means for driving said shaft into rotation including bearings 26 and 27, speed reduction box 28 and an electric motor 30. A control panel 32 enables the operator to control and monitor the various operations of the buffing apparatus. Worn tire 40 is mounted to shaft 22 by means of a split chuck 44 which is best seen in FIG. 2. Chuck 44 comprises collars 46 which can be interchanged to suit tires of widely varying widths. A first tire bead engaging disc 48 cooperates with a second tire bead engaging disc 50 for supporting worn tire 40 in position. Discs 48 and 50 can be slided along the free end of shaft 22 with a sufficiently close fit for preventing the escape of inflation air and to this effect a suitable rubber seal (not shown) will normally be used for this purpose. The second disc 50 is held in place by means of a screw assembly 54 which combines a spacer 56 and a spring loaded nut 58. Spacer 56 carries two or more axially extending pins 60 which project through axial apertures in nut 58, and coil springs 62 are disposed over pins 60 between spacer 56 and nut 58. The purpose of this spring loaded nut arrangement 54 is to urge the two discs 48 and 50 together to facilitate inflation of worn tire 40. Inflation is obtained by means of a source of compressed air 70 in communication with a longitudinally extending passage 72 leading to a discharge hole 74 positioned between discs 48 and 50.

Tire mounting assembly 20 is supported to base 10 by means of a first set of rails 81 and 82 which extend in a horizontal plane and in a direction parallel to bisecting plane of tire 40. Said bisecting plane of tire 40 is shown by means of line 84 in FIG. 2. Rails or tracks 81 and 82 are secured in spaced apart relation to base 10 and their upper load bearing surfaces are transversely curved. Rollers 85, 86 and 87 support the load of tire mounting assembly 20 on rails 81 and 82 and permit longitudinal displacement of the tire mounting assembly 12 therealong. These rollers are also designed to guide the tire mounting assembly 12 along rails 81 and 82 and to this effect they are preferably grooved as best illustrated in FIG. 2. Such rollers will hereinafter be referred to as "bobbin shaped rollers". Only one roller 87 is provided on the tire side of housing 20 since this three point mounting configuration is easier to adjust. Means (not shown) is provided for preventing lifting of housing 20 from base 10 and one particularly satisfactory arrangement consists of a pair of cooperating channels parallel to rails 81 and 82, one of these channels being secured to base 10 with a flange horizontally disposed a short distance above the surface of base 10 while the other channel is secured to the bottom of housing 20 with a horizontal flange located between the surface of base 10 and the horizontal flange of the first mentioned channel.

A double acting air cylinder 90 with one end 91 fixed relative to base 10 and the other end 92 connected to housing 20 permits displacement of housing 20 along rails 81 and 82 in the direction of arrow 94 as best seen in FIG. 1. This enables the operator to move tire mounting assembly 12 away from the buffing assembly 14 for changing the worn tire 40 at the end of a buffing operation. The other limit position of housing 20 is determined by a mechanical depth adjustment comprising a fixed abutment 95 and a longitudinally displaceable plunger 96. A manual control 98 comprising a hand wheel and a suitable screw permit the operator to adjust the limit position of housing 20 relative to fixed abutment 95 when housing 20 is moved to the buffing position under the action of air cylinder 90. In FIGS. 1 and 2, housing 20 is illustrated in the retracted position and dotted line 99 indicates the position of housing 20 when in place for carrying out the buffing of tire 40. Hence the operator will control the depth of the cut on the ground engaging surface of tire 40 by means of manual control 98 whose pitch can be of the order of one-eighth of an inch per revolution.

Buffing assembly 14 comprises a housing 110 which supports electric motor 112 that drives buffing rasp or wheel 114. A suitable brake 116 is provided for reducing the time necessary to change the sense of rotation of rasp 114.

A blower 120 cooperates with a pair of wings 121 and 122 and an exhaust 124 for collecting the rubber dust produced during the tire buffing operations.

A second pair of rails 131 and 132 mounted on base 10 permit lateral or transverse displacement of the buffing assembly relative to tire 40. Rails 131 and 132 are similar to rails 81 and 82 and support an auxiliary carriage 134 by means of four bobbin rollers 136.

A suitable drive means is used for moving buffing assembly 14 along rails 131 and 132 in a back-and-forth motion during the buffing operation. To this effect, a variable speed d.c. electric motor 135 mounted on base 10 drives a transversely extending screw and nut arrangement 137 connected at its free end to lug 138 on base 10. Base 10 supports a transversely extending bar 140 which carries two limit switches 141 and 142 which can be moved independently of one another along rod 140. A trip finger 144 on auxiliary carriage 134 operates limit switches 141 and 142 which form part of a control electric circuit (not shown) and thereby change the sense of rotation of motor 135. This electric circuit also changes the sense of rotation of motor 112 and drives buffing rasp 114. It also commands the operation of brake 116. The object of this arrangement is to permit reversal of the sense of displacement of auxiliary carriage 134 as well as the sense of rotation of rasp 114 and permit such reversals to take place within the minimum amount of time. For example in the case of a relatively narrow tire, the operator may move limit switches 141 and 142 closer together thereby to reduce the amplitude of the back-and-forth motion of buffing assembly 14.

Housing 110 is mounted to auxiliary carriage 134 by means of longitudinally extending rails 151 and 152 and a set of four bobbin wheels 153 and a double acting air cylinder 154 connected between housing 110 at 156 and to auxiliary carriage 134 at 158 allows the operator to move the entire buffing assembly 14 away from tire mounting assembly 12 and to return buffing assembly 14 to the position shown in FIGS. 1 and 2 for buffing.

The profile of the buffed surface on tire 40 is determined by the shape of a template 160 which is adjustably fixed relative to base 10 and a cam follower 162 consisting of a rotatable grooved disc 162 mounted to an extension 164 of housing 110. Hence one of the functions of air cylinder 154 is to resiliently maintain contact between follower 162 and template 160 although the force applied should not be too excessive and in fact should allow retraction of buffing assembly 110 in case of ripping of tire 40 during a buffing operation.

We have determined that double acting air cylinder 154 could be replaced by a single acting air cylinder combined with return springs whose sole function would be to maintain follower disc 162 in contact with template 160. In such an alternative arrangement the only function of a single acting air cylinder would be to move housing 110 away from the tire 40.

The force applied by air cylinder 90 maintaining tire mounting assembly 12 against abutment 95 should be considerably higher so that in case of ripping of the tire the operator standing immediately in front of control panel 32 will not be hurt.

Returning to the template and cam follower whose function is to determine the trajectory to be followed by buffing rasp 114, it has been found preferable to use a follower disc 162 of which the radius of the groove into which template 160 rides is equal to the radius of rasp 114. Since this arrangement affords a one to one relationship between the template and the profile on tire 40, the user of the buffing apparatus will be able to easily make his own templates should he be called to execute buffing operations on a tire whose design is either new or unusual, and for which no template had as yet been made.

It is essential that the trajectory of the buffing rasp 114 be perfectly centered upon the tread of tire 40 and to this effect a tire tread finder gauge 170 is provided. It includes a lever 172 at the end of which is pivotally mounted a gauge 174 whose lower edge is inwardly curved as seen in FIG. 2 and bears a scale or symmetrical index lines. Alternatively, gauge 174 can be replaced by an inverted V-shaped fork. The lower end of lever 172 is pivoted to housing 110 at 175 and a suitable weight 176 keeps gauge 170 normally spaced apart from tire 40. Template 160 is mounted on a transversely adjustable rod 178 retained to base 10 by means of holders 180 (one of which is seen in FIG. 1). A suitable locking device (not shown) is provided for retaining rod 178 and template 160 mounted thereto in fixed position on base 10 once the adjustment has been completed.

FIG. 3 illustrates a device used for retaining housing 110 of buffing assembly 14 on auxiliary carriage 134. The arrangement consists of an inverted track 201 secured to auxiliary carriage 134 and a spring loaded arrangement supported to the floor 202 of housing 110 and including rod 204 to the lower end of which a cross bar 206 is connected which supports rollers 208 that ride against inverted rail 201. The upper end of rod 204 is provided with threads which receive a nut 210 and a washer 212 for compressing a coil spring 214. This arrangement is disposed toward the forward end of housing 110 which is the left hand side thereof in FIG. 3 and the purpose of this arrangement is to prevent the housing 110 of the buffing assembly from being raised during the buffing operations. The arrangement also ensures displacement of housing 110 in a horizontal plane that is to say parallel to rails 151 and 152 in spite of the presence of rubber dust that might collect over the rails.

In order to limit the amount of rubber dust that might find its way over the various rail arrangements in this buffing apparatus, sheets of rubber (not shown) are used each of which having one edge secured to a side of housing 20 or 110 and the opposite edge secured to a self winding take-up rod rotatably mounted to base 10 with a return spring to maintain the sheet of rubber relatively tight. These arrangements of a sheet of rubber on a take-up rod in fact operate in a manner similar to window shades except that they extend horizontally a short distance above the various rails that they are designed to cover.

Referring again to the dust collector disposed around rasp 114, the two wings 121 and 122 are pivoted at 220 to a circular base 222 which in turn is freely rotatable around the axis of rotation 223 of buffing rasp 114. A return spring 225 interconnects the two wings 121 and 122 and exerts a slight force urging them one toward the other so that when tire 40 is moved in position for buffing the free ends of wings 121 and 122 will contact the sides of the tire under the action of spring 225.

However lateral displacement of buffing assembly 14 relative to base 10 will cause the head of the dust collector to pivot around axis 223 with the result that throughout the buffing operation most of the rubber dust will be picked up by the dust collecting system. A small air cylinder (not shown) may be provided in parallel with return spring 225 to cause automatic separation of wings 121 and 122 when tire mounting assembly 12 moves toward buffing assembly 14 for the carrying out of the buffing operation.

The operation of the above described buffing apparatus is substantially as follows. Assuming that there is no tire in position and that bead retaining disc 50 and the spring loaded nut arrangement 58 have been removed, the operator puts a worn tire in place with the bead of the tire properly engaged over the inner shoulder on disc 48. He then positions the second disc 50 and mounts the spring loaded nut arrangement 58 which will cause disc 50 to move inwardly sufficiently to seal the tire for inflation. At this point the operator operates switch 231 which causes admission of air at hole 74 and inflation of the tire 40. The next step is to manually lower gauge 174 and move buffing assembly 14 laterally until gauge 174 registers with the center of the thread on tire 40. This lateral displacement is obtained by means of switch 232 which determines the direction of rotation of motor 135 and by speed control 233 which is used for gradually varying the speed of rotation of motor 135 from zero to maximum speed.

Once the buffing assembly has been located with gauge 174 registering with the center of the thread on tire 40 motor 135 is switched off by means of switch 234 and the operator walks over to the rear of buffing apparatus for manually adjusting the position of template 160 relative to base 10. To this effect, he must unlock bar 178 and move it in the right direction until the middle of template 160 registers with an index mark 340 on base 10. He then locks bar 178 in position and returns to the control panel 32. His next operation is to actuate air admission lever 241 that controls the supply of air to air cylinder 154 allowing auxiliary carriage 134 to return to its position of buffing. This causes follower disc 162 to engage template 160. The following operation consists of actuating air admission lever 243 which controls the supply of compressed air to air cylinder 90 causing tire mounting assembly 12 to move toward buffing assembly 14 until plunger 96 contacts abutment 95. The exact positioning of tire mounting assembly 12 relative to buffing rasp 114 will however be determined by manual rotation of wheel 98 thus allowing for tires of varying diameters. Once tire 40 has been positioned close to buffing wheel 114 the operator actuates switch 251 which commands the electric motor 30 that drives tire 40 into rotation at a speed of about 60 r.p.m. Switch 251 also determines the sense of rotation of motor 30. At this point wings 121 and 122 have automatically closed and they contact the sides of tire 40 and the operator is free to start the buffing operation by switching to the on position the master switch 234 referred to above. Master switch 234 will cause starting of the back-and-forth motion of buffing assembly 14 under the action of electric motor 135 and will also cause rotation of the electric motor 112 of the buffing wheel 114. The electric motor 260 of the dust collector 120 will also be started at the same time.

From the moment of the beginning of the actual buffing operation to completion of the operation the operator has only one control to worry about namely a depth adjustment wheel 98 which is periodically turned a fraction of a revolution for increasing the depth of the cut. Should he wish to make spot checks all he has to do is actuate lever 243 and thereby cause retraction of tire mounting assembly 12 without however changing the setting of manual adjustment 98. Having examined the tire he may resume the buffing operation by actuating again lever 243 and cause tire mounting assembly 12 to return to the buffing position.

An emergency stop switch 250 is provided which when depressed automatically shuts off electric motor 30, 112, 135 as well as dust collector 120. However, as noted above, should there be an obstacle on the periphery of tire 40, the buffing assembly 14 will automatically retract itself due to the relatively small force that urges it toward tire 40. In practice, this force will be monitored by means of a suitable pressure meter as at 300 on control panel 32 indicative of the air pressure within cylinder 154, and a pressure adjustment device (not shown) will enable the operator to keep the pressure within safe limits.

We have found that this particular arrangement enables an operator of average skill to accomplish satisfactory buffing operations within as little as three minutes per tire even when the tires are of varying diameters or widths. It will be noted also that by suitably dimensioning the various components in the support means for the tire mounting assembly 12 and also plunger 96, this buffer design will be able to accept tires whose diameters may vary from the small tires of some 20 inches in outside diameter to the large size truck tires of 70 inches. Likewise, the variation in tire widths over which this buffing apparatus will be usable is only limited by the length of rails 131 and 132 and of limit switch mounting rod 140.

A main advantage of the above described buffing apparatus design is that the operator will be able to accurately control the depth of the cut throughout the buffing operation due to the presence of manual control 98 which includes a relatively large control wheel 98. This feature has been found to be very important to the buffing of tires using steel cords. Whereas with non-metallic cords no substantial damage will be caused when the first layer of cord is partially cut by buffing wheel 114, the steel cords on the other hand will tend to resist the cutting action of rasp 114 with the result that the tire will be distorted and rendered useless.

We have also found that the texture of the buffed surface will be vastly improved if, as a last step in the buffing operation, the operator causes the tire 40 to rotate in the opposite sense during a last pass of the buffing wheel 114 without changing the setting of control wheel 98. This improved texture has been found to enable better bonding between a new tread and the buffed tire carcass especially when use is made of the cold-cure retreading process.

In order to protect the eyes of the operator, a clear plastic chip guard 262 is mounted over housing 20 of tire mounting assembly 12. The safety of the operator is also enhanced by the fact that the buffing wheel 114 is located away from control panel 32 where the operator stands throughout the buffing operation.

I claim:

1. For use in an apparatus for buffing tires having a rotatable shaft with a threaded free end, a split chuck comprising a first tire bead engaging disc mounted to said shaft inwardly of the free end thereof, a second tire bead engaging disc closely fitting over the free end of said shaft and slidable therealong inwardly of the threads on said shaft a main nut having at least two axial apertures extending therethrough and engageable over the threaded portion of said shaft, means on said main nut for aiding the rotation thereof, a spacer between said nut and said second disc, at least two registering pins projecting axially outwardly from said spacer and extending through the axial apertures in said main nut and at least two coil springs, each coil spring being disposed over one of said registering pins and extending between the outer face of said spacer and the inner surface of said main nut for urging said spacer and said second tire bead engaging disc toward said first tire bead engaging disc when said main nut is mounted on said shaft, air supply means extending longitudinally of said shaft and leading to a discharge point located between said tire bead engaging discs in such a manner as to enable inflation of a tire in position on said chuck.

2. A method for buffing a worn tire with a buffing apparatus wherein the profile of the buffed surface is determined by a template, comprising rotating said tire in a first sense, grinding the worn engaging surface of said tire to a pre-determined depth by means of a buffing rasp whose axis is normal to the axis of rotation of said worn tire until said worn tire has obtained the desired profile, and as a last step in the buffing operation, rotating said tire in the opposite sense while said buffing rasp executes a last pass without changing the profile nor the depth of the cut.

3. Apparatus for buffing tires in preparation for retreading, comprising a buffing assembly which includes a housing and a buffing wheel, a tire mounting assembly, and support means for said buffing assembly and said tire mounting assembly; said apparatus further comprising:

first horizontal rectilinear rail means parallel to the plane of the tire once in place on said tire mounting assembly, said first rail means supporting said tire mounting assembly and permitting displacement thereof along said first rail means, second horizontal rectilinear rail means extending in a direction normal to said first rail means, said second rail means supporting said buffing assembly for displacement in a direction parallel to the axis of rotation of a tire mounted on said tire mounting assembly, first drive means for moving said buffing assembly along said second rail means in a back-and-forth motion during the buffing operation, an auxiliary carriage disposed between said buffing assembly and second rail means, said buffing assembly being displaceably mounted on said auxiliary carriage in a direction parallel to said first rail means, and said auxiliary carriage being horizontally displaceable in straight line in a direction normal to said first rail means, a template adjustably fixed relatively to said buffing assembly and said auxiliary carriage and to said support means, cam follower disc means carried by said buffing assembly for following the contour of said template throughout said back-and-forth motion, first moving means for moving said buffing assembly on said auxiliary carriage away from said tire between two buffing operations and for returning said buffing assembly in position for buffing and while in said position resiliently urging said cam follower disc means in contact with said template, first power means for rotating said tire during buffing, second power means for rotating the buffing wheel of said buffing assembly in one sense when said buffing assembly travels in one sense along said second rail means, and in the opposite sense when said buffing assembly moves in the opposite sense, limit switch means for controlling the sense of rotation of said buffing wheel while said first drive means is in operation and for controlling the sense of travel of said buffing assembly, second moving means for moving said tire mounting assembly away from said buffing assembly during the installation and removal of said tire, and for returning said tire mounting assembly in position for buffing, and while in said position resiliently urging said tire mounting assembly toward said buffing assembly with a force greater than the force applied by said first moving means for maintaining said cam follower disc means in contact with said template, fine adjustment means for determining the position of said tire mounting assembly in relation to the position of said template during buffing said tire, dust collector means for aspirating the rubber dust produced by the buffing wheel during the buffing of said tire, wherein said fine adjustment means comprises the combination of an abutment, fixed with respect to said support means, a horizontally disposed plunger extending in the direction of said first rail means toward said abutment and mounted to said tire mounting assembly, said plunger being maintained in contact with said adjustment by means of said second moving means when said tire mounting assembly is in position for buffing, and a control wheel whose angular position determines the position of said plunger relative to said tire mounting assembly.

4. Apparatus for buffing tires in preparation for retreading, comprising a buffing assembly which includes a housing and a buffing wheel, a tire mounting assembly, and support means for said buffing assembly and said tire mounting assembly; said apparatus further comprising:

first horizontal rectilinear rail means parallel to the plane of the tire once in place on said tire mounting assembly, said first rail means supporting said tire mounting assembly and permitting displacement thereof along said first rail means, second horizontal rectilinear rail means extending in a direction normal to said first rail means, said second rail means supporting said buffing assembly for displacement in a direction parallel to the axis of rotation of a tire mounted on said tire mounting assembly, first drive means for moving said buffing assembly along said second rail means in a back-and-forth motion during the buffing operation, an auxiliary carriage disposed between said buffing assembly and second rail means, said buffing assembly being displaceably mounted on said auxiliary carriage in a direction parallel to said first rail means, and said auxiliary carriage being horizontally displaceable in straight line in a direction normal to said first rail means, a template adjustably fixed relatively to said buffing assembly and said auxiliary carriage and to said support means, cam follower disc means carried by said buffing assembly for following the contour of said template throughout said back-and-forth motion, first moving means for moving said buffing assembly on said auxiliary carriage away from said tire between two buffing operations and for returning said buffing assembly in position for buffing and while in said position resiliently urging said cam follower disc means in contact with said template, first power means for rotating said tire during buffing, second power means for rotating the buffing wheel of said buffing assembly in one sense when said buffing assembly travels in one sense along said second rail means, and in the opposite sense when said buffing assembly moves in the opposite sense, limit switch means for controlling the sense of rotation of said buffing wheel while said first drive means is in operation and for controlling the sense of travel of said buffing assembly, second moving means for moving said tire mounting assembly away from said buffing assembly during the installation and removal of said tire, and for returning said tire mounting assembly in position for buffing, and while in said position resiliently urging said tire mounting assembly toward said buffing assembly with a force greater than the force applied by said first moving means for maintaining said cam follower disc means in contact with said template, fine adjustment means for determining the position of said tire mounting assembly in relation to the position of said template during buffing of said tire, dust collector means for aspirating the rubber dust produced by the buffing wheel during buffing of said tire, wherein said template is made of relatively thin but rigid sheet material and wherein said cam follower disc means is a grooved disc riding along an edge of said template, and wherein the radius of said disc in the bottom of said groove is equal to the radius of said buffing wheel.

5. Apparatus for buffing tires in preparation for retreading, comprising a buffing assembly which includes a housing and a buffing wheel, a tire mounting assembly, and support means for said buffing assembly and said tire mounting assembly; said apparatus further comprising:

first horizontal rectilinear rail means parallel to the plane of the tire once in place on said tire mounting assembly, said first rail means supporting said tire mounting assembly and permitting displacement thereof along said first rail means, second horizontal rectilinear rail means extending in a direction normal to said first rail means, said second rail means supporting said buffing assembly for displacement in a direction parallel to the axis of rotation of a tire mounted on said tire mounting assembly, first drive means for moving said buffing assembly along said second rail means in a back-and-forth motion during the buffing operation, an auxiliary carriage disposed between said buffing assembly and second rail means, said buffing assembly being displaceably mounted on said auxiliary carriage in a direction parallel to said first rail means, and said auxiliary carriage being horizontally displaceable in straight line in a direction normal to said first rail means, a template adjustably fixed relatively to said buffing assembly and said auxiliary carriage and to said support means, cam follower disc means carried by said buffing assembly for following the contour of said template throughout said back-and-forth motion, first moving means for moving said buffing assembly on said auxiliary carriage away from said tire between two buffing operations and for returning said buffing assembly in position for buffing and while in said position resiliently urging said cam follower disc means in contact with said template, first power means for rotating said tire during buffing, second power means for rotating the buffing wheel of said buffing assembly in one sense when said buffing assembly travels in one sense along said second rail means, and in the opposite sense when said buffing assembly moves in the opposite sense, limit switch means for controlling the sense of rotation of said buffing wheel while said first drive means is in operation and for controlling the sense of travel of said buffing assembly, second moving means for moving said tire mounting assembly away from said buffing assembly during the installation and removal of said tire, and for returning said tire mounting assembly in position for buffing, and while in said position resiliently urging said tire mounting assembly toward said buffing assembly with a force greater than the force applied by said first moving means for maintaining said cam follower disc means in contact with said template, fine adjustment means for determining the position of said tire mounting assembly in relation to the position of said template during buffing of said tire, dust collector means for aspirating the rubber dust produced by the buffing wheel during buffing of said tire, wherein said dust collector means includes two spaced apart wings mounted upon a common pivotable structure mounted on said buffing assembly, and a return spring urging said wings toward one another.

6. Apparatus as defined in claim 5 additionally including means for separating said wings for permitting insertion of said tire therebetween while said tire mounting assembly moves toward said buffing assembly.

7. Apparatus for buffing tires in preparation for retreading, comprising a buffing assembly which includes a housing and a buffing wheel, a tire mounting assembly, and support means for said buffing assembly and said tire mounting assembly; said apparatus further comprising:

a. first horizontal rectilinear rail means parallel to the plane of the tire once in place on said tire mounting assembly, said first rail means supporting said tire mounting assembly and permitting displacement thereof along said first rail means, b. second horizontal rectilinear rail means extending in a direction normal to said first rail means, said second rail means supporting said buffing assembly for displacement in a direction parallel to the axis of rotation of a tire mounted on said tire mounting assembly, c. first drive means for moving said buffing assembly along said second rail means in a back-and-forth motion during the buffing operation, d. an auxiliary carriage disposed between said buffing assembly and said second rail means, said buffing assembly being displaceably mounted on said auxiliary carriage in a direction parallel to said first rail means, and said auxiliary carriage being horizontally displaceable in straight line in a direction normal to said first rail means, e. a template assembly comprising a template mounted rearwardly of said buffing assembly housing and means for adjusting said template in a direction parallel to the axis of rotation of said tire and relative to said buffing assembly and said auxiliary carriage and to said support means and for locking said template in place, f. cam follower disc means carried by said buffing assembly for following the contour of said template throughout said back-and-forth motion, g. first moving means for moving said buffing assembly on said auxiliary carriage away from said tire between two buffing operations and for returning said buffing assembly in position for buffing and while in said position resiliently urging said cam follower disc means in contact with said template, h. first power means for rotating said tire during buffing, i. second power means for rotating the buffing wheel of said buffing assembly in one sense when said buffing assembly travels in one sense along said second rail means, and in the opposite sense when said buffing assembly moves in the opposite sense, j. limit switch means for controlling the sense of rotation of said buffing wheel while said first drive means is in operation and for controlling the sense of travel of said buffing assembly, k. second moving means for moving said tire mounting assembly away from said buffing assembly during the installation and removal of said tire, and for returning said tire mounting assembly in position for buffing, and while in said position resiliently urging said tire mounting assembly toward said buffing assembly with a force greater than the force applied by said first moving means for maintaining said cam follower disc means in contact with said template, l. fine adjustment means for determining the position of said tire mounting assembly in relation to the position of said template during buffing, and m. dust collector means for aspirating the rubber dust produced by the buffing wheel during buffing of said tire, n. a tire tread center finder gauge pivotably mounted on said buffing assembly and positionable rearwardly thereof for giving an indication of the transverse position of the tire in place on said tire mounting assembly at least prior to commencement of said buffing operation.

8. Apparatus as defined in claim 7 wherein said first and second moving means use a source of compressed air as power.

9. Apparatus as defined in claim 7 wherein each of said first and second rail means comprises two parallel spaced apart main rails with a transversely curved bearing surface and at least two spaced apart bobbin shaped rollers for each main rail, said buffing assembly being retained to said auxiliary carriage against lifting by means of an inverted rail and a spring loaded roller for rolling therealong.

10. Apparatus as defined in claim 7 additionally including brake means for stopping rotation of said buffing wheel at the end of each transverse motion of said buffing assembly.

11. Apparatus as defined in claim 10 wherein said first drive means includes manually operable control means for gradually varying the speed of travel of said buffing assembly along said second rail means from standstill to maximum speed.

* * * * *